US010650272B2

(12) United States Patent
Elgebeely et al.

(10) Patent No.: US 10,650,272 B2
(45) Date of Patent: *May 12, 2020

(54) ON DEMAND TESTING AS A SERVICE FOR BASE TEXT DIRECTION VERIFICATION TESTING

(71) Applicant: INTERNATIONAL BUSINESS MACHINES CORPORATION, Armonk, NY (US)

(72) Inventors: Aya R. A. Elgebeely, 6th of October City (EG); Mohamed M. El-Khouly, Giza (GI); Mariam M. R. A. Eltantawi, Giza (EG); Hisham E. Elshishiny, Cairo (EG)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 54 days.

This patent is subject to a terminal disclaimer.

(21) Appl. No.: 15/996,619

(22) Filed: Jun. 4, 2018

(65) Prior Publication Data
US 2018/0276496 A1 Sep. 27, 2018

Related U.S. Application Data

(63) Continuation of application No. 15/193,749, filed on Jun. 27, 2016, now Pat. No. 10,043,107.

(51) Int. Cl.
G06K 9/00 (2006.01)
G06K 9/62 (2006.01)
(Continued)

(52) U.S. Cl.
CPC ....... *G06K 9/6215* (2013.01); *G06K 9/00422* (2013.01); *G06K 9/00456* (2013.01); *G06K 9/3208* (2013.01); *G06K 9/6202* (2013.01); *G06K 9/6821* (2013.01); *G06K 9/72* (2013.01); *G06K 2209/013* (2013.01)

(58) Field of Classification Search
CPC .... G06K 9/6215; G06K 9/00456; G06K 9/72; G06K 9/3208; G06K 9/6202; G06K 9/6821; G06K 9/00422; G06K 2209/013
See application file for complete search history.

(56) References Cited

U.S. PATENT DOCUMENTS 5,784,069 A * 7/1998 Daniels ............... G06F 17/2217
345/467
9,135,151 B2 9/2015 Betak et al.
(Continued)

OTHER PUBLICATIONS

Anonymous, "A Method to Detect Bidi Layout (Right to Left) Problem Automatically" IP.com, IP.com No. 000232544 (Mar. 18, 2016) pp. 1-6.

*Primary Examiner* — Aaron W Carter
(74) *Attorney, Agent, or Firm* — Tutunjian & Bitetto, P.C.; Scott Dobson

(57) ABSTRACT

Methods and systems for testing base text direction (BTD) include comparing one or more images from an end-user system to a respective reference image associated with a respective text test case. Each of the one or more images includes respective text test case information. It is determined whether the end-user system produces BTD errors based on the comparison in accordance with one or more BTD error rules.

19 Claims, 7 Drawing Sheets

(51) Int. Cl.
*G06K 9/72* (2006.01)
*G06K 9/68* (2006.01)
*G06K 9/32* (2006.01)

(56) References Cited

U.S. PATENT DOCUMENTS

| | | |
|---|---|---|
| 9,189,462 B2 | 11/2015 | Lanin et al. |
| 9,529,606 B1 * | 12/2016 | Bahgat ................. G06F 16/958 |
| 10,043,107 B2 * | 8/2018 | Elgebeely ............. G06K 9/3208 |
| 2009/0144666 A1 * | 6/2009 | Lu .......................... G06F 17/211 |
| | | 715/859 |
| 2011/0107202 A1 | 5/2011 | El-Shishiny et al. |
| 2012/0109634 A1 * | 5/2012 | Lanin ................. G06F 17/2223 |
| | | 704/8 |
| 2017/0083493 A1 * | 3/2017 | Kumhyr .................. G06F 17/24 |
| 2017/0372171 A1 * | 12/2017 | Elgebeely ............ G06K 9/3208 |
| 2018/0276496 A1 * | 9/2018 | Elgebeely ............ G06K 9/3208 |

* cited by examiner

| BTD text test cases # | Input Text to end-user application | BTD Value setting | Correct Visual Output |
|---|---|---|---|
| 1 | First  Third | LTR | First ثانيا Third |
| 2 | First  Third | RTL | Third ثانيا First |
| 3 | First  Third | Contextual | First ثانيا Third |
| 4 | اولا Second ثالثا | LTR | ثالثا Second أولا |
| 5 | اولا Second ثالثا | RTL | أولا ثالثا Second |
| 6 | اولا Second ثالثا | Contextual | أولا ثالثا Second |

ON DEMAND TESTING AS A SERVICE FOR BASE TEXT DIRECTION VERIFICATION TESTING

BACKGROUND

Technical Field

The present invention generally relates to text display and, more particularly, to testing base text direction.

Description of the Related Art

While western languages are predominately written from left to right, many languages are written from right to left. For example Arabic and Hebrew are written and displayed from the right side of a paper or screen to the left. Bidirectional script support is the capability of a computer system to correctly display bi-directional text.

Early computer systems were designed only for support of a single writing system, typically displaying scripts left to right, and were usually based on the Latin alphabet only. Adding new character sets and character encodings enabled a number of other left-to-right scripts to be supported, but right-to-left scripts were not well supported. Furthermore, mixing left-to-right and right-to-left scripts was not practical.

In modern systems, scripts are displayed in accordance with the base text direction assigned to a phrase, paragraph, or block that contains it. The base text direction established a directional context that the bi-directional text system refers to decide how to handle the text.

Base text direction verification is a test of the order in which bi-directional text segments are displayed inside a text document. Currently, base text direction verification is conducted manually, which exposes the end-user application under test to third-party testers and results in a relatively high-cost associated with human testing. In addition, current base text direction testing is dependent on the platform where the end-user application under test is executed.

SUMMARY

A method for testing base text direction (BTD) includes comparing one or more images from an end-user system to a respective reference image associated with a respective text test case. Each of the one or more images includes respective text test case information. It is determined whether the end-user system produces BTD errors based on the comparison in accordance with one or more BTD error rules.

A system for testing BTD includes an image comparison module having a processor configured to compare one or more images from an end-user system to a respective reference image associated with a respective text test case. Each of the one or more images includes respective text test case information. The processor is further configured to determine whether the end-user system produces BTD errors based on the comparison in accordance with one or more BTD error rules.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Embodiments of the present invention provide a base text direction (BTD) verification through testing as a service. The present embodiments compares pairs of images for BTD test cases, provided by both the BTD testing system and the end-users (including both developers and testers), which allows for the system to be independent of the end-user platform.

The present embodiments thereby significantly lower the cost of BTD verification testing compared to human manual verification. By comparing images, regardless of the end-user application implementation, BTD testing of any application type (e.g., web, mobile, or desktop) is provided. In addition, because the test cases are sent to the end user, the end user's application is not exposed to any third parties, thereby providing security to the end user's development process. The present embodiments use images in standardized formats to maintain compatibility with all end-user platforms.

It should be understood that the present embodiments provide significant advantages over existing testing technologies. In particular, whereas end users (e.g., application developers) may find it difficult to perform rigorous BTD verification on their own, the present embodiments perform such testing for them, providing reliable and secure information, thereby enabling developers to improve regionalization and language support in their applications.

It is specifically contemplated that BTD verification may be performed on a cloud computing system using Platform as a Service (PaaS). The application can be provisioned to developers and testing users as a special type of Software as a Service (SaaS) referred to herein as Testing as a Service (TaaS). It is to be understood in advance that, although this disclosure includes a detailed description of cloud computing, implementation of the teachings recited herein are not limited to a cloud computing environment. Rather, embodiments of the present invention are capable of being implemented in conjunction with any other type of computing environment now known or later developed.

To perform BTD verification, the present embodiments acquire images showing the text in question from a set of testing third-party users. The images are processed, for example in a cloud computing system, and then compared to each other, with matches and mismatches being recorded.

The matching statistics are tested using a set of rules to identify BTD errors. There will be different sets of rules for each pair of bidirectional languages. The present embodiments are discussed in the context of English (a left-to-right language) and Arabic (a right-to-left language).

Figure 1:
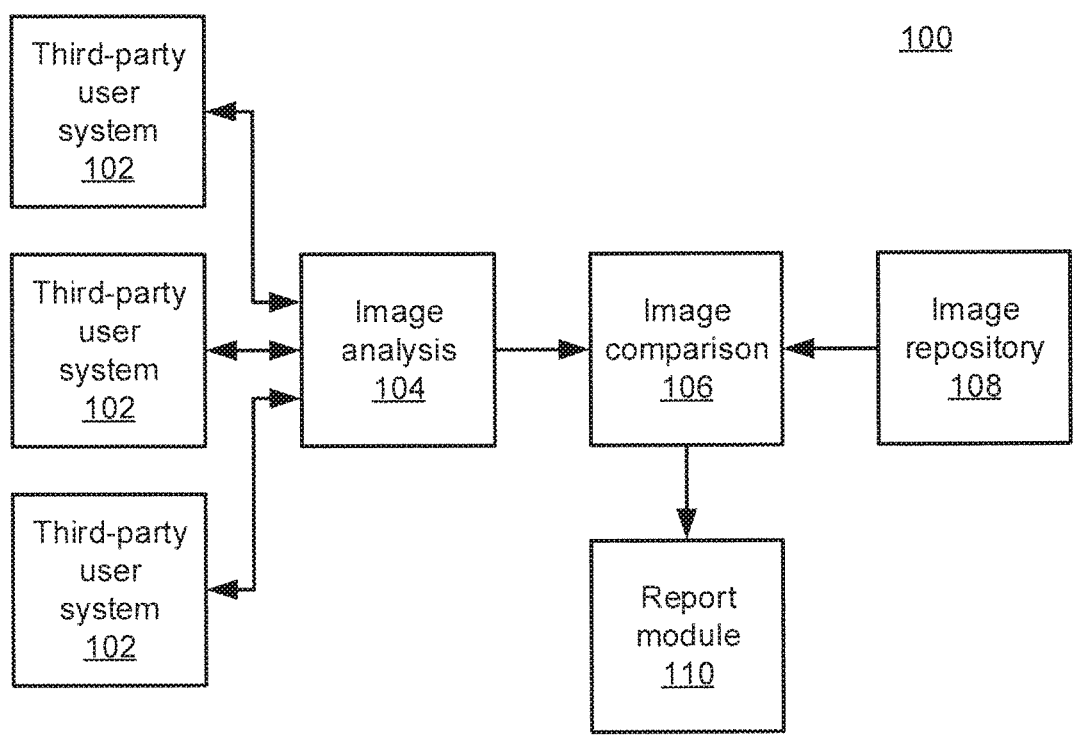
FIG. 1 is a block diagram of a Testing as a Service (TaaS) system for base text direction (BTD) testing in accordance with the present principles.

Referring now to FIG. 1, a TaaS system 100 is shown. One or more third-party user systems 102 are used to run an application under test. The third-party user systems 102 include a user interface that displays text in accordance with a BTD test case, having received the input text of the text case (along with attendant information such as font name and font size) from the image analysis module 104. It is specifically contemplated that unstructured text may be used that is composed of different segments and is based on bi-directional characters. The user system 102 displays the input text and captures an image of the text as displayed. The images of the displayed test cases are forwarded to the image analysis module 104. Additional information may also be forwarded, including font name and font size for the two languages under test.

It should be understood that the image analysis module 104 is specifically contemplated as being a cloud computing system, but the functions described herein may also be performed by a local or remote centralized server. The image analysis module 104 filters noise from the screen captures sent by the third-party user systems 102. The image analysis module 104 may also convert the uploaded screen captures to an image format appropriate for storage in an image repository 108. The screen captures may also be resized to a standard size for the image repository 108, with the text from the test cases being located at a specified location in the image, for example by cropping the images to fit exactly only the text area in the image.

Image comparison module 106 retrieves images stored in the image repository 108 for the test cases and compares pairs of images corresponding to each test case. Mismatched images will have different word sequences in the test case, which would result in a large difference from comparison in the images. In contrast, small differences from the comparison could result from, for example, noise that can be ignored by selecting a matching tolerance threshold. A similarity metric is used by the image comparison module 106 to compare the two and to generate a similarity score, with similarity scores below a threshold corresponding to mismatched images. All matches and mismatches between pairs of images are recorded corresponding to the test cases.

The image comparison module 106 then applies a set of rules to the match/mismatch record to identify any BTD errors that have occurred. Different pairs of languages will have different sets of rules. While English and Arabic are discussed in detail herein, it should be recognized that any pair of left-to-right and right-to-left languages may be used instead. The image repository 108 is linked to the image comparison module 106 and stores the test case images along with their respective BTD setting values. There will be a different set of images for each pair of languages. A report module 110 compiles a report for an end user or software designer that describes any BTD errors that were located.

Figure 2:
FIG. 2 is a set of BTD test cases in accordance with the present principles.
Figure 2:
Figure 2:

Referring now to FIG. 2, an exemplary set of test cases is shown. Each row illustrates a different test case, with the test case number being shown in row 202, the input text being shown in row 204, the BTD setting value being shown in row 206, and the expected correct visual output being shown in row 208. Each text test case is a sequence of words selected to test a specific type of BTD error.

The text test cases are written in a specific font type and size—preferably a large, bold font to facilitate image comparison. The text images 208 are generated for each text test case at a specific location in the respective images. Test cases such as these are stored in the image repository 108 and are used to test for particular BTD errors in end-user applications. For example, the following table illustrates how the test cases of FIG. 2 may be used to identify BTD errors. As used herein, there are three possible BTD properties for a given piece of text. The text may be designated as being displayed right-to-left, left-to-right, or based on context. For right-to-left and left-to-right, the text will always be ordered as indicated. For contextual ordering, the text is ordered based on the first character of the text. For example, if the text starts with an Arabic character, it will be displayed as right-to-left text, while if it starts with a Latin character, it will be displayed as left-to-right.

| Error # | Error description | Passing test cases | Failing test cases |
|---|---|---|---|
| 1 | Always LTR | 1, 3, 4 | 2, 5, 6 |
| 2 | Always RTL | 2, 5, 6 | 1, 3, 4 |
| 3 | Always contextual | 1, 3, 4, 6 | 2, 5 |

An error arises then if the system or software being tested by the end-user application fails to render the test text in the manner indicated by the test case's BTD property. If the end-user application always displays bi-directional text left-to-right (error #1), then it will pass test cases 1, 3, and 4 from the test cases of FIG. 2, but will fail on test cases 2, 5, and 6, because it will incorrectly display right-to-left text and contextual text as being left-to-right. Similarly, if the end-user application always displays bi-directional text right-to-left (error #2), then it will pass test cases 2, 5, and 6 and fail on test cases 1, 3, and 4. If the end-user application always displays bi-directional text contextually (error #3), then it will pass test cases 1, 3, 4, and 6 and fail on test cases 2 and 5. The report generated by report module 110 may include the indication of the error number to identify the BTD error and may optionally provide additional information that specifies the test cases which the end-user application failed.

This table therefore represents a set of rules governing testing. If a particular end-user application 102 passes certain test cases and fails certain other test cases, then a respective error is generated and the end user developer can respond accordingly.

Figure 3:
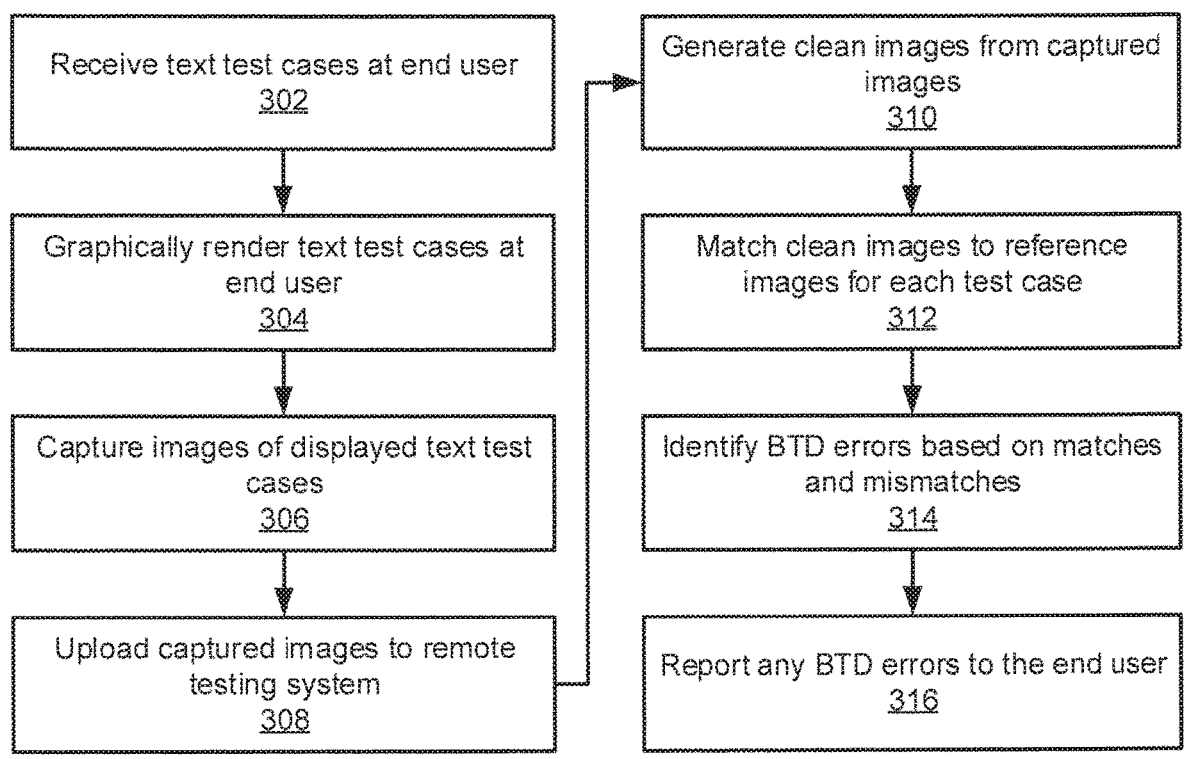
FIG. 3 is a block/flow diagram of a method for BTD testing in accordance with the present principles.

Referring now to FIG. 3, a method for testing end-user applications' bi-directional text support is shown. Block 302 receives text test cases at the end user 102. As noted above, each test case includes a string of text and instructions on how the text is to be displayed (e.g., the BTD and any associated font information). Block 304 then graphically renders the text test cases at the end user 102 in accordance with the instructions. This step uses the end-user application to display the text, but errors in the application's design may result in inaccurate BTD display. Block 306 therefore captures images of the displayed text test cases and block 308 uploads the captured images to image analysis module 104.

Block 310 generates clean images from the captured images at image analysis module 104, for example by noise-filtering and resizing the images such that the captured text is positioned correctly for matching with reference images. Block 312 then matches the clean images to stored reference images associated with each respective test case at the image comparison module 106 using an image similarity metric. Exemplary image similarity metrics include mean squared error and peak signal-to-noise ratio, but it should be understood that any appropriate image similarity metric may be used. In one example, block 312 generates a similarity score and then compares the similarity score to a similarity threshold, with scores that fall below representing mismatches between the clean image and the reference image.

Block 314 uses the matches and mismatches determined by block 312 to identify BTD errors. As noted above, block 314 may use a set of rules to determine what BTD error has occurred based on which test cases match the expected reference image and which test cases fail to match the expected reference image. Block 316 then reports any BTD errors to the end user, so that the error can be corrected.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 4:
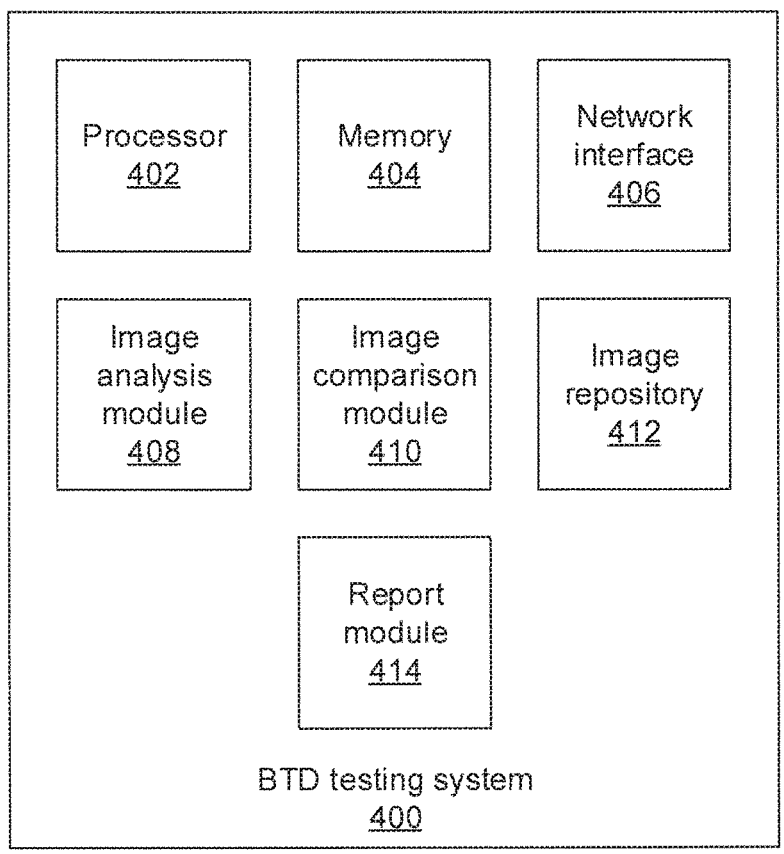
FIG. 4 is a block diagram of a BTD testing system in accordance with the present principles.

Referring now to FIG. 4, a BTD testing system 400 is shown. In this embodiment, BTD testing is performed by a single, remote device, but it should be understood that alternative embodiments may be in the form of a distributed or cloud computing solution. The BTD testing system 400 includes a hardware processor 402 and memory 404. The BTD testing system 400 also includes a network interface 406 that enables the BTD testing system to communicate with one or more end-user systems 102. In addition, the BTD testing system 400 may include functional modules that are implemented as software that stored in memory 404 and executed by processor 402. In alternative embodiments, the functional modules may be implemented as one or more discrete hardware components in the form of, e.g., application-specific integrated chips or field programmable gate arrays.

For example, an image analysis module 408 communicates with the end-user systems 102 to provide text test cases to the end-user systems 102 and to receive captured images from the end-user systems 102. The image analysis module 408 performs any needed operations on the captured images, including noise filtering and resizing the images, to produce clean images. An image comparison module 410 then compares the clean images to reference images that are stored in the memory 404 in image repository 412 and determines for each test case whether the text displayed at the end-user system 102 matches the reference image. The image comparison module 410 further uses one or more rules to determine whether the pattern of image matches and mismatches represents a BTD error and, if so, block 414 includes such information in a report provided to the end user.

Figure 5:
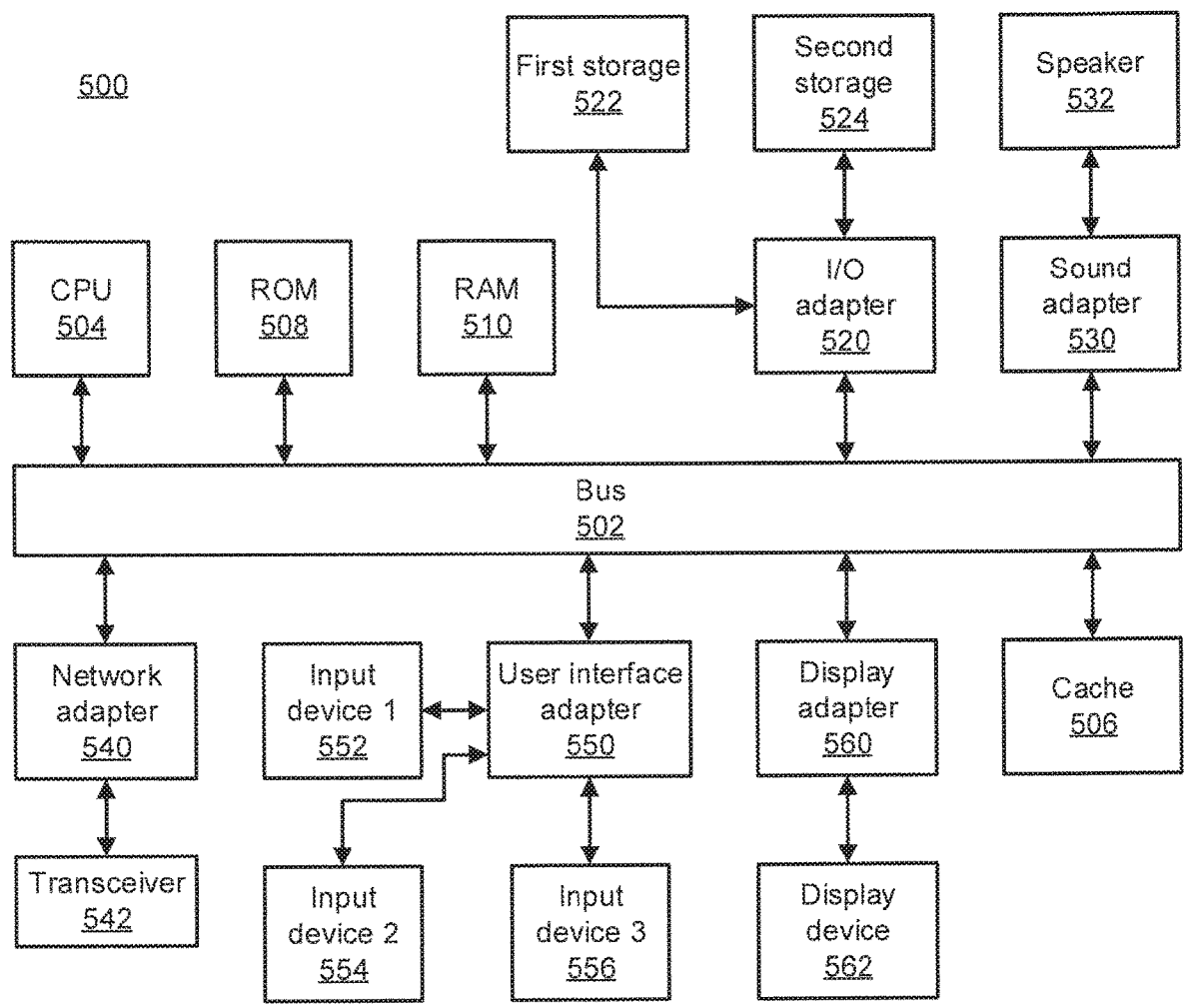
FIG. 5 is a block diagram of a processing system in accordance with the present principles.

Referring now to FIG. 5, an exemplary processing system 500 is shown which may represent the BTD testing system 400. The processing system 500 includes at least one processor (CPU) 504 operatively coupled to other components via a system bus 502. A cache 506, a Read Only Memory (ROM) 508, a Random Access Memory (RAM) 510, an input/output (I/O) adapter 520, a sound adapter 530, a network adapter 540, a user interface adapter 550, and a display adapter 560, are operatively coupled to the system bus 502.

A first storage device 522 and a second storage device 524 are operatively coupled to system bus 502 by the I/O adapter 520. The storage devices 522 and 524 can be any of a disk storage device (e.g., a magnetic or optical disk storage device), a solid state magnetic device, and so forth. The storage devices 522 and 524 can be the same type of storage device or different types of storage devices.

A speaker 532 is operatively coupled to system bus 502 by the sound adapter 530. A transceiver 542 is operatively coupled to system bus 502 by network adapter 540. A display device 562 is operatively coupled to system bus 502 by display adapter 560.

A first user input device 552, a second user input device 554, and a third user input device 556 are operatively coupled to system bus 502 by user interface adapter 550. The user input devices 552, 554, and 556 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 552, 554, and 556 can be the same type of user input device or different types of user input devices. The user input devices 552, 554, and 556 are used to input and output information to and from system 500.

Of course, the processing system 500 may also include other elements (not shown), as readily contemplated by one of skill in the art, as well as omit certain elements. For example, various other input devices and/or output devices can be included in processing system 500, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 500 are readily contemplated by one of ordinary skill in the art given the teachings of the present principles provided herein.

Figure 6:
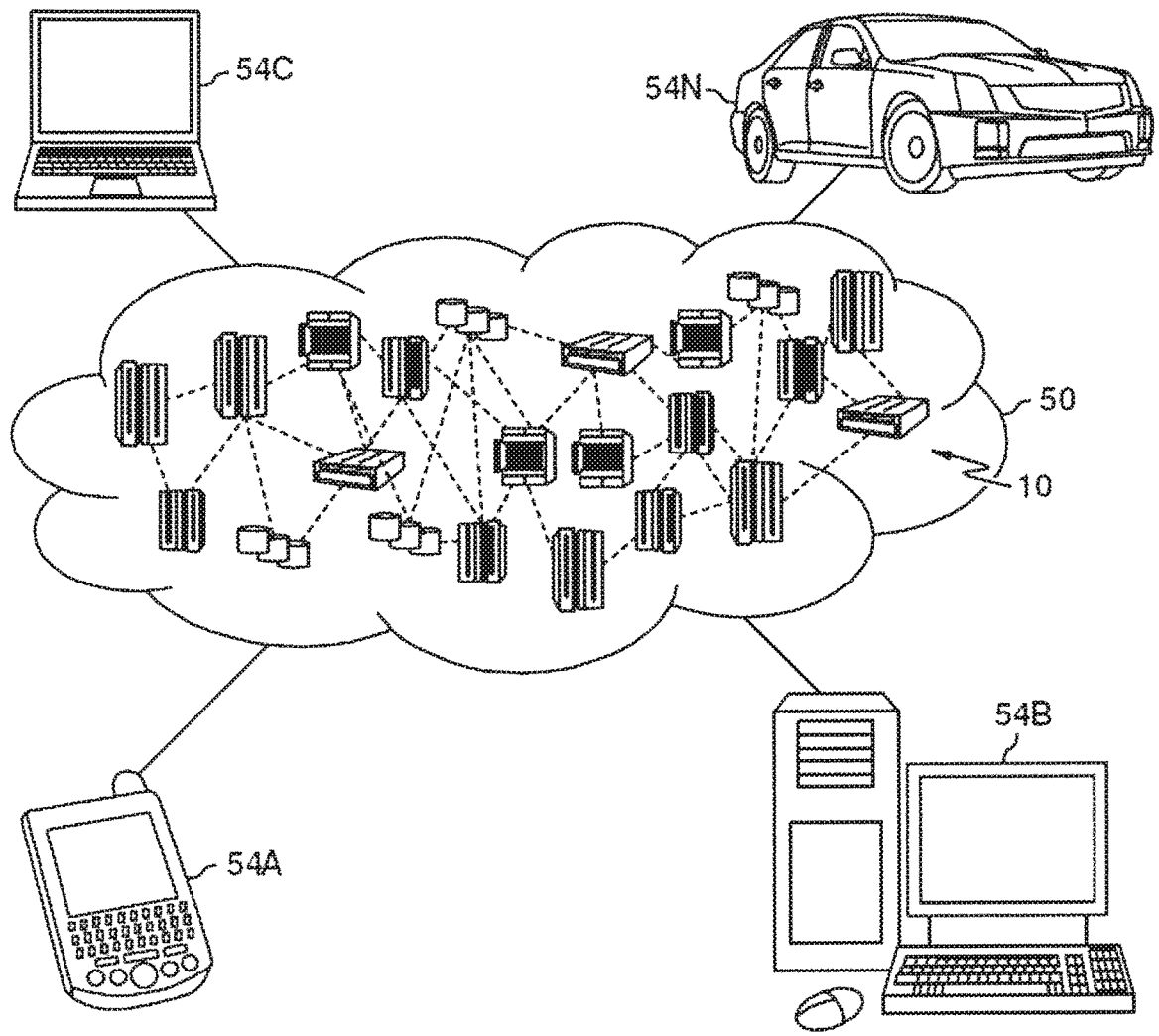
FIG. 6 is a diagram of a cloud computing environment according to the present principles.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
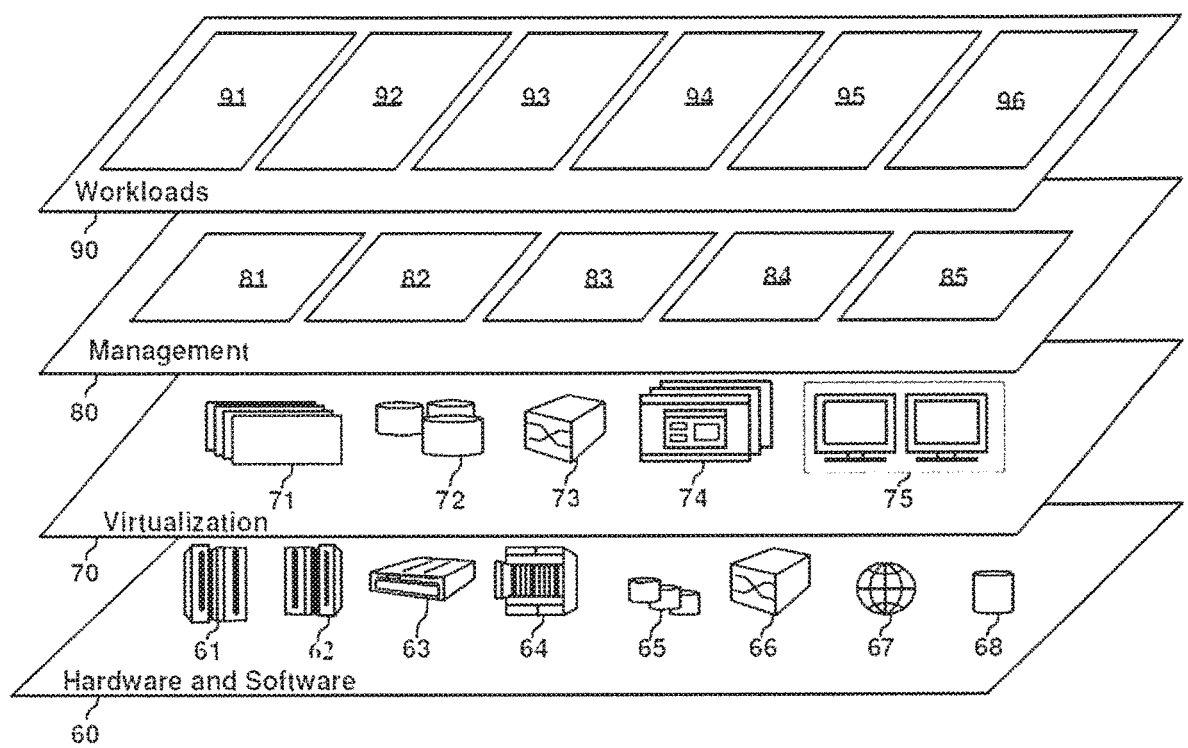
FIG. 7 is a diagram of abstraction model layers according to the present principles.

Referring now to FIG. 7, a set of functional abstraction layers provided by cloud computing environment 50 (FIG. 6) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and source code optimization 96.

Having described preferred embodiments of on-demand testing as a service for base text direction verification testing (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for testing base text direction (BTD), comprising:
   comparing one or more images from an end-user system to a respective reference image associated with a respective text test case, each of said one or more images including respective text test case information; and
   determining whether the end-user system produces BTD errors based on the comparison in accordance with one or more BTD error rules.

2. The method of claim 1, further comprising transmitting the text test case information to the end-user system.

3. The method of claim 2, wherein the transmitted text test case information comprises a text string and an associated BTD.

4. The method of claim 2, wherein the transmitted text test case information comprises a font definition, a font size, and image capture information that defines text position and image size.

5. The method of claim 1, further comprising filtering the received one or more images prior to said comparison to remove noise.

6. The method of claim 1, wherein comparing each of said one or more images to a respective reference image comprises determining a similarity between images using a similarity metric to produce a respective similarity score.

7. The method of claim 6, wherein comparing each of said one or more images to a respective reference image further comprises comparing the respective similarity score to a similarity threshold and determining that each of said one or more images matches the respective reference image if the respective similarity score exceeds the similarity threshold.

8. The method of claim 1, wherein the one or more BTD error rules each comprise a set of matching test cases and a set of mismatching test cases associated with each of a plurality of types of BTD error.

9. The method of claim 1, wherein each test case includes text from a first language that is displayed left-to-right and text from a second language that is displayed right-to-left.

10. A non-transitory computer readable storage medium comprising a computer readable program for improving content accessibility, wherein the computer readable program when executed on a computer causes the computer to perform the steps of:
    comparing one or more images from an end-user system to a respective reference image associated with a respective text test case, each of said one or more images including respective text test case information; and
    determining whether the end-user system produces BTD errors based on the comparison in accordance with one or more BTD error rules.

11. A system for testing base text direction, comprising:
    an image comparison module comprising a processor configured to compare one or more images from an end-user system to a respective reference image associated with a respective text test case, each of said one or more images including respective text test case information, and to determine whether the end-user system produces BTD errors based on the comparison in accordance with one or more BTD error rules.

12. The system of claim 11, further comprising a network interface configured to transmit the text test case information to the end-user system.

13. The system of claim 12, wherein the transmitted text test case information comprises a text string and an associated BTD.

14. The system of claim 12, wherein the transmitted text test case information comprises a font definition, a font size, and image capture information that defines text position and image size.

15. The system of claim 11, further comprising an image analysis module configured to filter the received one or more images prior to image comparison to remove noise.

16. The system of claim 11, wherein the image comparison module is further configured to determine a similarity between images using a similarity metric to produce a respective similarity score.

17. The system of claim 16, wherein the image comparison module is further configured to compare each respective similarity score to a similarity threshold and to determine that each of said one or more images matches the respective reference image if the respective similarity score exceeds the similarity threshold.

18. The system of claim 11, wherein the one or more BTD error rules each comprise a set of matching test cases and a set of mismatching test cases associated with each of a plurality of types of BTD error.

19. The system of claim 11, wherein each test case includes text from a first language that is displayed left-to-right and text from a second language that is displayed right-to-left.

* * * * *